United States Patent
Muhler

[15] 3,670,076
[45] June 13, 1972

[54] DENTAL PROPHYLAXIS COMPOSITION COMPRISING ALUMINA OF PARTICULAR PARTICLE SIZE

[72] Inventor: Joseph C. Muhler, Indianapolis, Ind.
[73] Assignee: Indiana University Foundation, Bloomington, Ind.
[22] Filed: March 31, 1970
[21] Appl. No.: 24,354

[52] U.S. Cl. ................................424/157, 424/49
[51] Int. Cl. ..........................................A61k 7/16
[58] Field of Search ..................424/4, 9–58, 157

[56] References Cited

FOREIGN PATENTS OR APPLICATIONS 1,559,196   1/1969   France.....................................424/49

*Primary Examiner* — Richard L. Huff
*Attorney* — Ronald L. Engel, Daniel W. Vittum, Jr. and Gomer W. Walters

[57] ABSTRACT

A mixture of relatively large and relatively small alpha alumina particles (comprising between about 2.5 percent and 10 percent small particle size alumina and balance large particle size alumina) provides a superior abrasive component for a dental prophylaxis paste adapted for infrequent application to the teeth.

6 Claims, No Drawings

3,670,076

DENTAL PROPHYLAXIS COMPOSITION COMPRISING ALUMINA OF PARTICULAR PARTICLE SIZE

BACKGROUND OF THE INVENTION

1. Field of the Invention

This invention relates to prophylactic paste compositions and to manners of formulating and utilizing such compositions. More particularly, it relates to such compositions containing a unique alumina cleaning and polishing agent which not only serves to clean and polish teeth but also enhances the effectiveness of anticariogenic components.

2. Description of the Prior Art

The past decade has witnessed a remarkable advance in the art of anticariogenic dentifrice preparations in that means have been established for utilizing fluoride-containing compounds for reducing the incidence and limiting the severity of carious teeth.

It has heretofore been attempted to utilize the beneficial aspects of fluoride-containing preparations in professional prophylaxis treatments, that is, the application of a specially formulated prophylactic paste to the teeth by dentists or dental hygienists in a routine dental prophylaxis. One such attempt was predicated upon utilization of sodium fluoride, a known effective anticariogenic agent. However, apparently due to the inactivation of the fluoride ion by the cleaning and polishing agent, this method did not prove satisfactory and was not adopted by the dental profession to any considerable extent.

A further development involved the utilization of silica powder and silicone in combination with stannous fluoride. While promising anticariogenic benefits were indicated by laboratory treatment with the stannous fluoride-silica-silicone prophylaxis paste, serious drawbacks to actual clinical utilization of such a paste were presented. This paste failed to effectively clean and polish the teeth and had the undesirable attribute of causing the patient to regurgitate upon administration of the paste to the oral cavity.

Another step in the development of a suitable prophylactic paste was the combination of lava pumice and anticariogenic fluoride components, such as stannous fluoride. This technique has found commercial acceptance and is in current practice. Moreover, it appears that a combination of the lava pumice prophylactic paste treatment with a topical stannous fluoride application and even with a daily utilization of a stannous fluoride dentifrice enhances the anticariogenic results obtained by the prophylaxis.

Broge U.S. Pat. No. 3,003,919, granted Oct. 10, 1961, discloses a complex alumina produced by the controlled dehydration of alpha alumina trihydrate to produce a dehydrated alumina mixture comprising no more than about 20 percent gamma alumina, no more than about 10 percent alpha alumina, between about 20 and 90 percent kappa alumina, and balance amorphous alumina. This abrasive, which has utility when employed in dentifrices adapted for frequent (up to several times daily) application to the oral hard tissues, is not satisfactory for use in a dental prophylaxis paste, both because of the crystal structure of the alumina and because of the particle size distribution (at least 80 percent of the particles in the patented composition lie in the 3–20 micron range).

As a result, it would be desirable to obtain an improved alumina abrasive system to overcome the inability of the alumina abrasive of the aforesaid patent to perform satisfactorily in a prophylaxis composition in order to provide a superior cleaning and polishing component for a dental prophylaxis paste.

A further object of this invention is to provide a prophylactic paste composition containing biologically available anticariogenic agents for the reduction of dental caries.

In a more specific sense, it is an object of this invention to provide a prophylactic paste cleaning and polishing agent which serves to enhance the effectiveness of the anticariogenic adjuvants contained in the prophylactic paste.

It is a related object of this invention to provide such a cleaning and polishing agent which exhibits compatibility characteristics with anticariogenic agents such that a greater percentage of biologically available constituents is evidenced and which can effectively clean and polish teeth more effectively than prior compositions.

It is another object of this invention to provide a cleaning and polishing agent which is useful in prophylactic paste formulations for hygienic, cosmetic, and prophylactic purposes.

It is yet another object of this invention to provide a prophylactic paste composition which serves to reduce the acid solubility of tooth enamel.

It is yet another object of this invention to provide a high cleaning and polishing prophylactic paste composition characterized by a novel combination of large and small alumina particles.

SUMMARY OF THE INVENTION

The foregoing and other objects, advantages, and features of the subject invention can be achieved with a dental prophylaxis composition adapted for relatively infrequent application to the oral hard tissues comprising as its essential cleaning and polishing agent a mixture of a major amount of relatively large (i.e., between about 30 and 75 microns) and a minor amount of relatively small (i.e., less than about 15 microns) particles of alumina, $Al_2O_3$, substantially all of which is in the alpha crystalline phase. More particularly, the mixture comprises between about 2.5 and 10 percent relatively small particles and about 90–97.5 percent relatively large particles. The bulk (i.e., in excess of about 75 percent) of the relatively large particles lie in the range of about 30–53 microns particle size, whereas the bulk (i.e., about 75 percent or more) of the relatively small particles are less than about 5 microns particle size. Preferably, the foregoing alumina cleaning and polishing agents are incorporated in a dental prophylaxis paste which additionally comprises at least one fluoride-containing anticariogenic agent at a level of about 40–70 percent by weight of the prophylactic paste composition.

DETAILED DESCRIPTION OF THE PREFERRED EMBODIMENTS

In accordance with this invention, a dental prophylaxis composition adapted for relatively infrequent application to the oral hard tissues comprises as its essential cleaning and polishing agent a mixture of a major amount of relatively large (i.e., between about 30 and 75 microns) and a minor amount of relatively small (i.e., less than about 15 microns) particles of alumina, $Al_2O_3$, substantially all of which is in the alpha crystalline form.

More particularly, the mixture comprises between about 2.5 and 10 percent relatively small particles and balance (i.e., 90–97.5 percent) large particles. The bulk (i.e., in excess of about 75 percent) of the relatively large particles lie in the range of about 30–53 microns particle size, and the bulk (i.e., about 75 percent or more) of the relatively small particles are less than about 5 microns particle size. At most, only a minor amount (i.e., no more than about 10 percent) of the alumina particles lie in the medium range (i.e., between about 15 and 30 microns).

Preferably, the foregoing alumina cleaning and polishing agents are incorporated in a dental prophylaxis paste which additionally comprises at least one fluoride-containing anticariogenic adjuvant at a level of about 0.1–20 percent by weight of the prophylactic paste composition, calculated as fluoride ion.

The size of particles in polishing compositions can be expressed in a number of ways, one of the most common of which is "mean diameter," i.e., the average diameter of a particle (as determined by appropriate measurement such as by a floatation process, by electron diffraction comparison with known styrene balls, or by light microscopy techniques), with the number of such particles in each given diameter range being expressed on a weight percentage basis. As hereinafter utilized, the term "particle size" refers to such a means diameter value.

Alumina is a naturally occurring mineral, one crystalline form of which is the alpha phase. Naturally occurring alpha alumina is processed in accordance with known techniques, generally described hereinafter, in order to produce the particular particle size compositions of the relatively large and relatively small alumina compositions employed in accordance with the present invention.

The preparation of suitably sized particles of the alumina ore may be accomplished by conventional techniques well known to the art. Basically these techniques involve milling an appropriate ore, followed by standard screen sifting (or air separation) to segregate the desired particle sizes. Various milling techniques (e.g., hammer and ball milling) may be utilized in order to obtain the desired surface configurations.

As is well known in the art, hammer mills utilize a high speed rotary shaft having a plurality of hammers or beaters mounted thereon. The hammers may be T-shaped elements, bars, or rings fixed or pivoted to the shaft or to discs pivoted to the shaft. The shaft runs in a housing containing grinding plates or liners. The grinding action results from the impact between the material being milled and the moving hammers. When the ore is milled by attrition techniques such as hammer milling, relatively rough, jagged particles are produced. Particles having such jagged surface configurations generally function, from a surface cleaning standpoint, in a relatively superior manner as compared to more smoothly configured particles.

Similarly, a ball mill comprises a cylindrical or conical shell rotating on a horizontal axis which is charged with a grinding medium such as balls of steel, flint, or porcelain. The grinding is accomplished by the tumbling action of the balls on the material to be ground. Particles of ore treated in a ball mill of the character described have relatively smooth surface configurations and function relatively better from a polishing standpoint than more jaggedly configured particles.

In addition to the described milling and sieving techniques, the alpha alumina materials in question may be physically or chemically treated in order to remove undesirable impurities prior to formulation of the prophylaxis paste compositions in accordance with the present invention.

As previously noted, the alumina cleaning and polishing composition of the present invention comprises about 90–97.5 percent relatively large alumina particles and about 2.5–10 percent by weight relatively small alumina particles. As noted, the relatively large alpha alumina particles lie substantially in the range of 30–75 microns, with the particles predominantly falling in the range of about 30–53 microns (i.e., at least about 75 percent). The relatively large component accomplishes primarily a tooth cleaning function, whereas the relatively small particles are believed to accomplish primarily a polishing function.

The bulk (i.e., about 75 percent or more) of the relatively small particles are less than 5 microns particle size, with a smaller, but significant amount (e.g., up to about 25 percent) lying in the 5–10 or 5–15 micron range. A preferred particle size distribution of alumina particles is given in the accompanying example.

EXAMPLE I

Preferred Particle Size Distribution

| Relatively Large $Al_2O_3$ Particles | | | 95% |
|---|---|---|---|
| Particle Size | | Weight (%) | |
| <74 | | 0.1 | |
| >53 | <74 | 10.5 | |
| >30 | <53 | 83.0 | |
| <30 | | 6.4 | |
| | Total: | 100.0 | |

| Relatively Small $Al_2O_3$ Particles | | | 5% |
|---|---|---|---|
| Particle Size | | Weight (%) | |
| >10 | <15 | 4.0 | |
| >5 | <10 | 21.0 | |
| <5 | | 75.0 | |
| | Total: | 100.0 | 100% |

Substantially all of both the relatively large and relatively small alumina particles take the alpha crystalline form. However, the benefits of this invention may be achieved even though minor amounts, i.e., preferably no more than about 10 or 15 percent, of amorphous alumina or alumina of other crystalline forms may be present as impurities.

The alumina cleaning and polishing composition of the present invention may be applied directly to the teeth as a powder in aqueous slurry form. However, it is preferred that the agent be applied in the form of a prophylactic paste composition. The cleaning and polishing agent is provided in the paste composition within a range of about 30–80 percent by weight of the over-all composition, depending upon the particular formulation desired, as is well known to one skilled in the art. The prophylactic paste may be prepared in a conventional manner and usually includes additional ingredients that render the over-all composition commercially acceptable. For example, prophylactic pastes typically embody conventional components such as bleaching agents, binders, humectants, flavoring agents, water, and the like in the range of up to about 50 percent by weight. Through the use of a prophylaxis paste of the character described, it is possible to obtain clean, yet highly polished, oral hard tissues during the infrequent (i.e., semi-annual) professional prophylaxis performed by or under the supervision of a dentist or dental hygienist.

However, it is preferred that anticariogenic agents be incorporated in such prophylaxis pastes so that the advantages of such agents may be obtained in addition to the cleaning and polishing advantages of the abrasive component. The anticariogenic agent may comprise one or more water-soluble fluoride salts, especially stannous ion containing fluoride salts, including $SnF_2$, NaF, $SnF_4$, KF, $InF_3$, $PbF_2$, $FeF_2$, and LiF, as well as more complex water-soluble fluoride-containing agents such as fluorosilicates, e.g., $Na_2SiF_6$, fluorozirconates, e.g., $CaZrF_6$, $Na_2ZrF_6$, $K_2ZrF_6$, $SnZrF_6$, $InZrF_7$, fluorostannites, e.g., $NaSnF_3$, $KSnF_3$, $NaSn_2F_5$, fluoroborates, e.g., $NaBF_4$, fluorotitanates, e.g., $NaTiF_5$, and fluorogermanates, e.g., $K_2GeF_6$, $Zr(GeF_6)_2$, $ZrOGeF_6$, $In_2(GeF_6)_3$, and mixed halides, e.g., SnClF and $Sn_2ClF_3$. As noted, mixtures of suitable adjuvants may also be utilized. Preferably, the adjuvant should be presented in the form of fluoride-containing compounds capable of supplying both fluoride and stannous ions or combinations thereof, for example with an additional component, such as zirconium, indium, or germanium ions, in biologically available form. Preferred agents include $SnZrF_6$ and $SnF_2$.

Such anticariogenic agents are preferably employed at an effective and non-toxic level, usually within the range of about 0.1 to about 20 percent by weight of the paste composition (calculated as fluoride ion). When $SnF_2$ or $SnZrF_6$ are utilized, such salts are preferably employed at levels of about 8 and 30 percent, respectively (i.e., 8 percent $SnF_2$ supplies about 2 percent fluoride ion and about 30 percent $SnZrF_6$ supplies about 10 percent fluoride ion).

Advantageously, a source of stable phosphate (e.g., an orthophosphate such as mono- or di-sodium or potassium orthophosphate) is provided in conjunction with the fluoride agent at a level of up to 10 or 15 percent in order to enhance its anticariogenic activity.

EXAMPLE II

Non-Therapeutic Prophylactic Paste

| Constituent | Amount (% by Weight) |
|---|---|
| Relatively large $Al_2O_3$ | 49.44 |
| Relatively small $Al_2O_3$ | 2.61 |

| | |
|---|---|
| Distilled water | 12.29 |
| Glycerin | 14.34 |
| Sorbitol | 16.94 |
| Veegum | 0.65 |
| Xanthan gum | 1.00 |
| Saccharin, sodium | 0.65 |
| Flavoring | 2.08 |
| Total: | 100.00 |

EXAMPLE III

Non-Therapeutic Prophylactic Paste

| Constituent | Amount (% by Weight) |
|---|---|
| Relatively large $Al_2O_3$ | 65.52 |
| Relatively small $Al_2O_3$ | 3.45 |
| Distilled Water | 12.83 |
| Glycerin | 6.70 |
| Sorbitol | 8.13 |
| Veegum | 0.86 |
| Xanthan Gum | 1.48 |
| Saccharin, sodium | 0.11 |
| Flavoring | 0.92 |
| Total: | 100.00 |

EXAMPLE IV

Therapeutic Prophylaxis Paste

| Constituent | Amount (% by Weight) |
|---|---|
| Relatively large $Al_2O_3$ | 54.20 |
| Relatively small $Al_2O_3$ | 2.85 |
| Distilled water | 12.29 |
| Glycerin | 5.84 |
| Sorbitol | 8.44 |
| Veegum | 0.65 |
| Xanthan Gum | 1.00 |
| Saccharin, Sodium | 0.65 |
| Flavoring | 2.08 |
| $NaH_2PO_4$ | 8.00 |
| NaF | 4.00 |
| Total: | 100.00 |

EXAMPLE V

Therapeutic Prophylaxis Paste

| Constituent | Amount (% by Weight) |
|---|---|
| Relatively large $Al_2O_3$ | 49.44 |
| Relatively small $Al_2O_3$ | 2.61 |
| Distilled water | 12.29 |
| Glycerin | 5.34 |
| Sorbitol | 7.94 |
| Veegum | 0.65 |
| Xanthan Gum | 1.00 |
| Saccharin, sodium | 0.65 |
| Flavoring | 2.08 |
| $NaH_2PO_4$ | 9.00 |
| $SnF_2$ | 9.00 |
| Total: | 100.00 |

The following procedure may be employed in order to achieve a thorough cleaning and polishing of the teeth and for effective anticariogenic prophylaxis (on an annular or semi-annual basis as required) to be obtained.

Each tooth is thoroughly scaled in order to remove all calculus and soft debris. After scaling is completed, the prophylactic base is dispensed into a measuring cup (which can be supplied with the prophylaxis kit), and the anticariogenic adjuvant (in combination with water) is added to the cup to form the prophylactic paste. By using a soft rubber cup and an excess of the prophylactic paste, the applicator polishes the buccallabial surfaces of the maxillary right quadrant. Each surface of the tooth is treated for at least 10 seconds. Then the lingual surfaces of the maxillary right quadrant are correspondingly treated. Unwaxed dental floss (which may be supplied with the prophylaxis kit) is used in all interproximals and preferably is utilized with an excess of the prophylactic paste. The patient may be allowed to rinse thoroughly with water any time during the treatment.

After rinsing, the lingual one-half of the maxillary left quadrant is polished and the patent is allowed to rinse. The buccolabial one-half of the maxillary left quadrant is polished and the patient is allowed to rinse. The buccolabial one-half of the maxillary left quadrant is polished, but the patient is not allowed to rinse until all of the interproximal contacts have been cleaned and polished with the unwaxed dental floss. The buccal and lingual surfaces of the mandibular right molars and bicuspids are then polished. Unwaxed dental floss is used in the interproximals before rinsing.

The mandibular anterior teeth are polished next, both labially and lingually, and the interproximal areas are polished with the unwaxed dental floss. The buccal and lingual surfaces of the mandibular right molars and biscuspids are then polished. Unwaxed dental floss is used in the interproximals before rinsing. The buccal and lingual surfaces of the mandibular left molars and bicuspids are then polished, the interproximals are dental flossed, and the patient is allowed to rinse. The occlusal surfaces are then polished with a stiff bristle prophylactic brush and the prophylactic paste. The patient is then allowed to rinse his mouth as thoroughly as possible.

While the foregoing procedure carried out on a professional basis (i.e., by a dentist or dental hygienist) permits widespread beneficial results to be achieved, because of the limited amount of professional time that is available, another advantageous procedure involves the thorough self-application of the paste by the patient using a toothbrush under professional direction in order substantially to duplicate the benefits of a professional application procedure.

EXPERIMENTAL EFFECTIVENESS

The superiority of the alumina prophylaxis cleaning and polishing agents disclosed herein as compared with other abrasives has been substantiated by the following experimental evaluations. A definite laboratory cleaning test procedure has been used to evaluate the prophylaxis agents of the present invention and flour of pumice for comparative purposes. This procedure (as set forth and described in Cooley et al. U.S. Pat. No. 3,151,027) involves the use of polyester plastic blocks specifically designed for use in an electrical tooth-brushing machine. The blocks are ground smooth, washed, dried, and a thin coating of black lacquer is carefully applied to the surface of the block. The blocks are tared and the reflectance determined using the reflectometer. The blocks are then inserted in a specially designed device containing a block-stabilizer and a conventional dental handpiece equipped with webbed rubber dental prophylaxis cups. The blocks are then given a 60-second prophylaxis mechanically using the predetermined prophylactic paste and a pressure of 150 grams and speed of rotation of the cups of 1,500 r.p.m. Following the treatment reflectance measurements of the blocks are obtained and the blocks are weighed. The removal of the lacquer as determined by the change in reflectance or the loss in weight is indicative of the cleaning ability of the paste. The cleaning values are expressed in ratio form, using flour of pumice as the reference standard.

Enamel polishing values have also been obtained for the same materials. In accordance with this method, the lingual surfaces of freshly extracted maxillary anterior teeth are reduced with the aid of a diamond disc, and the teeth are mounted by means of a low melting alloy, such as Wood's metal, on hexagonal jigs constructed so as to fit the movable stage of a reflectometer. The exposed labial surface of each tooth is mounted in such a manner that the height of the contour is a suitable distance above the base of the jig. Throughout the procedure, care is taken to ensure that the teeth do not become dry in order to prevent damage of the tooth tissues. The exposed enamel surface is then dulled by exposing it to 0.10 percent hydrochloric acid (pH 2.2) for 30 seconds. Any acid remaining on the tooth surface is neutralized by immediately transferring the tooth to a saturated sodium carbonate solution for 30 seconds. The tooth is then rinsed with water and blotted dry.

The maximum reflectance of the dulled tooth surface is determined by means of a reflectometer especially adapted to detect the changes in the degree of polish of the enamel surface. The reflectometer is constructed so that the enamel is exposed to a beam of polarized light, and the amount of light reflected from the enamel surface is determined by a photoelectric cell which in turn activates a galvanometer. The smoother the enamel surface, the smaller the amount of diffused and absorbed light and, hence, the higher the galvanometer reading.

After the maximum reflectance of the dulled tooth is determined, the tooth is polished with a dental prophylaxis cup powered by a dental engine employing the material to be tested. After the tooth has been brushed, the enamel surface is rinsed with water so as to remove any residual particles of the cleaning and polishing agent, and the reflectance of the enamel surface is again measured with the tooth located in exactly the same position as that used to obtain the "dull" reading. The absolute change in the amount of reflectance between the dulled and polished enamel surfaces is taken as a measure of the degree of polishing imparted by the prophylaxis treatment, and the data are reported in Table I in the form of a polishing ratio using flour of pumice as a reference standard.

The materials of this invention do not remove substantial amounts of oral hard tissue. A method for determining enamel abrasion values for the agents is as follows. The enamel portions are separated from human central incisors and exposed to neutron radiation whereby a predetermined portion of phosphate content is converted to $P^{32}$. Each enamel specimen is mounted in a low melting alloy, such as Wood's metal, or in a self-curing polymer, such as methyl methacrylate. The specimens are then placed in the specially-designed apparatus consisting essentially of a means of stabilizing the enamel specimen and a conventional dental handpiece equipped with a webbed rubber dental prophylaxis cup arranged in such a manner that the speed of rotation of the cup and tension on the enamel surface may be regulated at 1,500 r.p.m. and 150 grams, respectively. The enamel specimen is then given a 60-second prophylaxis with the various prophylactic pastes with the residual paste collected in a notched glass beaker. The residual paste is then converted to an aqueous slurry by diluting to a volume of 10.0 milliliters and duplicate 2.0 ml aliquots are placed in planchets, dried at room temperature, and the radioactivity ($P^{32}$) determined using a conventional scintillation detector. By comparing the radioactivity of the slurries of the experimental prophylactic pastes to that obtained on each enamel specimen with flour of pumice and arbitrarily assigning flour of pumice an enamel abrasion score of 1,000, the relative abrasiveness of the experimental prophylactic pastes may be determined.

Cleaning ratios, polishing ratios, and enamel abrasion values for the compositions of this invention and for flour of pumice are set forth in Table I.

TABLE I

Summary of Typical Data Concerning Cleaning, Polishing, and Abrasion with New Dental Prophylactic Paste

| Prophylactic Paste | Cleaning Ratio | Polishing Ratio | Enamel Abrasion Ratio |
|---|---|---|---|
| Flour of Pumice (slurry) | 10.00 | 15.00 | 1000 |
| New Prophylactic Paste | 16.68 | 18.54 | 645 |

The criticality of the relative proportions of relatively large and relatively small alpha alumina particles in accordance with the present invention has been substantiated by obtaining polishing values and cleaning scores for the series of abrasive agents comprising various proportions of the relatively large and relatively small alpha alumina particle materials identified in Example I. These data, which are given in Table II, establish that between the limits identified above (i.e., 90–97.5 percent relatively large particles and 2.5–10 percent relatively small particles), substantial and surprisingly different results are achieved relative to the compositions lying outside the indicated ranges.

TABLE II

Composition—Relative Parts by Weight

| Relatively Large* Alumina | Relatively Small* Alumina | Polishing Ratio | Cleaning Ratio |
|---|---|---|---|
| 1 | 0 | 13.45 | 18.87 |
| 1 | 1 | 9.16 | 4.58 |
| 6 | 1 | 10.35 | 7.29 |
| 9 | 1 | 16.58 | 15.10 |
| 19 | 1 | 17.64 | 17.14 |
| 29 | 1 | 14.25 | 18.71 |
| 39 | 1 | 14.38 | 18.17 |
| 0 | 1 | 20.14 | 2.54 |

*As identified in Example I

The present invention thus provides unique combination alumina abrasives of particular particle size, which, when employed in both anticariogenic and non-anticariogenic compositions, provides new and unique superior dental prophylaxis agents.

I claim:

1. A dental prophylaxis cleaning and polishing agent comprising as its essential component at least about 90 percent by weight of the component of relatively large alumina particles lying preponderantly in the range of about 30–75 microns and a minor amount of relatively small alumina particles lying preponderantly in the range of up to about 15 microns particle size, substantially all of the alumina particles being of the alpha crystalline form.

2. A cleaning and polishing agent, as claimed in claim 1, wherein the component comprises about 2.5–10 percent of the relatively small alumina particles.

3. A cleaning and polishing agent, as claimed in claim 1, wherein at least about 75 percent of the relatively large particles lie in the range of about 30–53 microns and at least about 75 percent of the relatively small particles lie in the range of up to about 5 microns particle size.

4. A method for cleaning and polishing the oral hard tissues comprising the application thereto of a dental prophylaxis cleaning and polishing agent comprising as its essential component at least about 90 percent by weight of the component of relatively large alumina particles lying preponderantly in the range of about 30–75 microns and a minor amount of relatively small alumina particles lying preponderantly in the range of up to about 15 microns particle size, substantially all of the alumina particles being of the alpha crystalline form.

5. A method, as claimed in claim 4, wherein the component comprises about 2.5–10 percent of the relatively small alumina particles.

6. A method, as claimed in claim 4, wherein at least about 75 percent of the relatively large particles lie in the range of about 30–53 microns and at least about 75 percent of the relatively small particles lie in the range of up to about 5 microns particle size.

* * * * *